(12) United States Patent
Hauck (10) Patent No.: US 8,232,484 B2
(45) Date of Patent: Jul. 31, 2012

(54) WEIGHING SENSOR WITH A SERIAL ARRANGEMENT OF FORCE TRANSFER LEVERS TO OBTAIN A COMPACT LOAD CELL

(75) Inventor: Timo Hauck, Kaiserlautern (DE)

(73) Assignee: Wipotec Wiege-und Positioniersysteme GmbH, Kairserslautern (DE)

( * ) Notice: Subject to any disclaimer, the term of this patent is extended or adjusted under 35 U.S.C. 154(b) by 746 days.

(21) Appl. No.: 12/161,543

(22) PCT Filed: Jan. 19, 2007

(86) PCT No.: PCT/DE2007/000087
§ 371 (c)(1),
(2), (4) Date: Apr. 29, 2009

(87) PCT Pub. No.: WO2007/082513
PCT Pub. Date: Jul. 26, 2007

(65) Prior Publication Data
US 2011/0226535 A1 Sep. 22, 2011

(30) Foreign Application Priority Data

Jan. 19, 2006 (DE) .......................... 10 2006 002 711

(51) Int. Cl.
*G01G 21/24* (2006.01)
*G01G 7/02* (2006.01)
(52) U.S. Cl. ................ 177/210 EM; 177/212; 177/229; 73/862.634
(58) Field of Classification Search ........... 177/210 EM, 177/212, 229; 73/863.634, 862.634
See application file for complete search history.

(56) References Cited

U.S. PATENT DOCUMENTS

| 4,184,556 | A | * | 1/1980 | Kunz | 177/210 EM |
|---|---|---|---|---|---|
| 4,553,618 | A |  | 11/1985 | Kusmenskji et al. |  |
| 4,585,083 | A | * | 4/1986 | Nishiguchi | 177/229 |
| 4,799,561 | A |  | 1/1989 | Komoto |  |
| 4,832,092 | A |  | 5/1989 | Hirose et al. |  |
| 5,340,951 | A |  | 8/1994 | Hungerbuhler et al. |  |
| 5,347,092 | A |  | 9/1994 | Buchs et al. |  |
| 5,525,762 | A | * | 6/1996 | Maaz et al. | 177/229 |
| 6,326,562 | B1 |  | 12/2001 | Burkhard et al. |  |
| 6,365,847 | B1 | * | 4/2002 | Muller et al. | 177/210 EM |
| 6,657,138 | B2 | * | 12/2003 | Klauer et al. | 177/185 |
| 7,838,783 | B2 | * | 11/2010 | Hauck | 177/210 EM |
| 8,044,308 | B2 | * | 10/2011 | Kusumoto | 177/210 EM |

(Continued)

FOREIGN PATENT DOCUMENTS

DE  32 18 943 A1  11/1983

(Continued)

OTHER PUBLICATIONS

JPO, Notification of Reason for Refusal issued Feb. 7, 2011 in corresponding Japanese Patent Application No. 2008-550632 (9 pages).

(Continued)

*Primary Examiner* — Randy W Gibson
(74) *Attorney, Agent, or Firm* — The Culbertson Group, P.C.

(57) ABSTRACT

The above described preferred embodiments are intended to illustrate the principles of the invention, but not to limit the scope of the invention. Various other embodiments and modifications to these preferred embodiments may be made by those skilled in the art without departing from the scope of the present invention.

21 Claims, 9 Drawing Sheets

U.S. PATENT DOCUMENTS

| | | |
|---|---|---|
| 2001/0052431 A1 | 12/2001 | Klauer et al. |
| 2006/0096790 A1 | 5/2006 | Muehlich et al. |
| 2007/0034419 A1 | 2/2007 | Kuhlmann et al. |
| 2007/0125185 A1 | 6/2007 | Hauck |
| 2010/0224422 A1* | 9/2010 | Hauck .................... 177/210 EM |

FOREIGN PATENT DOCUMENTS

| | | |
|---|---|---|
| DE | 32 43 350 A1 | 9/1984 |
| DE | 94 19 160 U1 | 2/1995 |
| DE | 195 40 782 C1 | 12/1996 |
| GB | 2 285 871 A | 7/1995 |
| JP | 62-082328 A | 4/1987 |
| JP | 2002-107214 A | 4/2002 |
| JP | 2002-107220 A | 4/2002 |
| JP | 2003-247886 A | 9/2003 |
| WO | WO 03/002954 A1 | 1/2003 |

OTHER PUBLICATIONS

JPO, Decision of Refusal issued May 27, 2011 in corresponding Japanese Patent Application No. 2008-550632 (3 pages).

* cited by examiner

WEIGHING SENSOR WITH A SERIAL ARRANGEMENT OF FORCE TRANSFER LEVERS TO OBTAIN A COMPACT LOAD CELL

TECHNICAL FIELD OF THE INVENTION

The present invention relates to a preferably monolithically constructed weighing sensor, particularly as used for rotary filling heads or multi-head scales.

BACKGROUND OF THE INVENTION

Such weighing sensors are advantageously arranged in a circle, wherein it is attempted to accommodate a maximum of weighing cells in as small a circular arc as possible in order to save overall space.

Rotary filling heads, as in DE 20304296 U1, for example, in which numerous filling stations are arranged in a circle, are known in the beverage industry; since they can be continuously filled, such heads make high product throughput possible. These filling machines have a filling head with a flow controller that portions out the respective desired amount of the material to be filled.

Volumetric rotary filling heads are known for pourable bulk material. The filling head is adjusted corresponding to the density of the material to be filled, and a constant volume is directed into the corresponding container to be filled. The disadvantage of these filling systems lies in the density variation of the supplied products. For example, detergents can be conducted from the silo or directly from the flocculating system to the filling system, and thus have a differing density due to the different pile heights. Moreover, the volume ranges, and thus the weight ranges of the material to be filled, are limited, i.e., such systems can be operated only with a limited measurement range. Volumetrically operating rotary filling heads usually have a downstream monitoring scale, which checks the filling weight of the packages and readjusts the filling head amount accordingly. The disadvantage of these filling systems lies in the control weighing process that takes place relatively far away from the actual filling process, which entails a higher defect rate for products with incorrect weights due to the time delay of the downstream monitoring scale.

According to prior art, rotary filling heads are known that are based on weighing technology by means of DMS. The disadvantage appearing here is the long settling time of the DMS weighing cell upon load input. This property is further intensified by the rotation of the complete filling head. Furthermore, DMS weighing cells exhibit bending with an increasing load, which must be alleviated in prior art (DE 372 78 66 C2) by an additional correction cell, for example.

During the installation of weighing equipment in the head of a rotationally operating filling machine, problems arise with the installation conditions of a measuring cell. Weighing cells typical in prior art have a cuboid housing; when they are being inserted into a divided circle, one recognizes that the smallest possible divided circle diameter is severely limited by the geometric shape of the measuring cell.

The weighing cells disclosed in prior art in EP 1 409 971 B1 with a wide threaded connection to the stationary base and a trapezoidal parallelogram guidance are not suitable for inclusion in a divided circle.

EP 518202 B1 discloses a weighing sensor in which the individual functional units of the block system are implemented by means of thin sections. The illustrations show a narrowly constructed weighing sensor; there is again the problem that the force-compensating magnet system represents the largest width of the system and, as is known from prior art, lies opposite the load receiving side. Here as well, the divided circle diameter is decisively determined by the magnet arrangement.

The length dimensions of the weighing cells entail another disadvantage. Prior art demonstrates weighing cells that comprise a parallelogram load sensor, wherein the elastic transmission that reduces the magnitude of an applied force is constructed between the upper and lower arms of the parallelogram. Prior art demonstrates various weighing sensors with up to 4 transmission ratio stages, with very high-ratio systems of up to 1500:1 being primarily found in static applications.

The weighing sensors known from prior art are designed with a compensation lever that is extended up to the compensation system. In the case of electromagnetic force compensation, this is a system consisting of a coil and a permanent magnet system. The magnet is arranged downstream of the step-down transmission, as described, e.g., in DE 19923207 C1. The upper and lower parallelogram arms, among other things, are constructed on the fixed part.

For monolithic weighing systems produced by machining, prior art therefore presents a spatially successive arrangement of load receiver, transmission lever, stationary base element and magnet system. Prior art further displays a magnet surrounded by block material in order to achieve a very high measuring precision for the system. It is evident here to a person skilled in the art that such a system is not suitable for a circular arrangement with the objective of the smallest possible divided circle diameter A design with a magnet arranged between the two parallelogram beams (e.g., in DE 3243350 C2) can indeed be arranged in a space-saving manner, but the lever principle and the limited transmission ratio of the system in this arrangement limits the use to a very limited weight range.

The essential factor for the suitability of a weighing sensor based on the principle of electromagnetic compensation is the construction of as narrow an overall shape of the weighing cell as possible. The disadvantage of such a design lies in the weakening of the Roberval transmission with respect to torsion perpendicular to the force induction in the transverse direction passing through the block system. It is known from prior art that monolithically constructed weighing sensors are advantageously constructed with a coupling element, consisting of an intermediate web and two thin sections, between the load receiver and the first lever (and the additional transmission levers). Another advantageous design in prior art has been to construct a thin section in the first coupling rod in the longitudinal direction of the load receiver in order to avoid torsional torques on the transmission levers. As an example, one can refer in this regard to the publication EP 291 258 A2, especially FIG. 2.

The combination of a narrow Roberval transmission (for forced parallel guidance of the load receiver) and the thin section formed as mentioned above leads to a weighing sensor with low torsional rigidity in case of eccentric force introduction transverse to the block. It was therefore mentioned in EP 1550849 A2 that the parallelogram arm be constructed correspondingly wider than the block system, which represents a considerable extra expense compared to the weighing sensor originally constructed primarily in two dimensions.

SUMMARY OF THE INVENTION

In view of the above-mentioned disadvantages, the problem of the invention is to create a load sensor that is constructed to be as short as possible (in regard to the distance between load sensor and the stationary base). The construction should simultaneously be as narrow or compact as possible, and offer a sufficient transmission ratio that is secure and largely free of interfering forces. It should also be possible to provide a maximum of weighing cells on as small a divided circle as possible.

The invention recognizes that the width of weighing cells according to prior art is determined substantially by the components for force compensation, particularly by one or more coils and the magnets interacting with them. In the weighing sensor of the invention, these components are moved as far as possible radially outwards, away from the center. Insofar as the weighing cell to be arranged in a circular form with other weighing sensor faces the center of the circle with its immobile base element (stationary base), the components of the force compensation system are moved as far outwards radially and away from this stationary base as possible, i.e., in the direction towards the load receiver of the weighing sensor, arranged at the outer periphery of the latter.

According to the invention, a shape of the weighing sensor is thereby made possible that has a substantially rectangular form, for example, when viewed from the top. The force compensation system is shifted towards a narrow side of the rectangle. Since it also projects past the long sides of the rectangular shape, the weighing sensor overall has a roughly trapezoidal outline. This outline tapers down towards the imaginary center of the circle. The load receiver facing outwards can also have a greater width than the base element (or stationary base) facing the center, so that the trapezoidal shape results even from this fact. The components of the force compensation system, in particular, the coil and the magnet, are then shifted according to the invention into the area of the load receiver, which allows the accommodation of these relatively large components because of its greater width.

This allows a particularly compact construction of the weighing sensor with a sufficiently large transmission ratio, since a series of at least two levers is provided, wherein the levers are optionally connected to one another by coupling elements. Differently from the known prior art, in which the force compensation system is often arranged outside the base element (towards the center of the circle), or at least close to the base element, this construction in the radial direction allows a particularly short and space-saving form.

More particularly, it is provided according to the invention that, in functional effect, the series of levers and coupling elements runs around a section of the base element projecting between the parallel guidance elements in order to make good use of the internal construction space of the monolithic block. As viewed in the Z direction (see FIGS. 1-6 as well) the levers or the coupling elements run around the projecting section along the X and Y direction. This permits the formation of the longest possible levers or lever arms with a construction that is still as short as possible.

At least one lever or coupling element can be run past the projecting base element section on one or both sides (as viewed in the Z direction). Asymmetrically running a lever or coupling element on only one side of the projecting section is expressly also allowed. In each case, the objective of the invention of utilizing the constructive space as well as possible, and at the same time, that it remain as compact as possible, is achieved. It is also conceivable to arrange one or more levers on the side of the projecting section, or to support it or them on the projecting section. What is crucial to the advantage according to the invention is the arrangement of the levers or coupling elements such that their force flow runs around the section projecting in the X direction in order to then be conducted back into the area of the load receiver.

In its simplest form, an embodiment of the invention provides a preferably monolithically constructed weighing sensor that is constructed for an electronic scale according to the principle of electromagnetic force compensation. The weighing sensor extends in three mutually perpendicular directions, X, Y and Z.

As will become clear particularly with reference to the figures, the load receiver and the fixed base element (stationary base) are separated from one another substantially in the X direction, this X direction also corresponding to the radial direction along which the weighing sensor extends away from the center when it is arranged in a circle with additional weighing sensors. The Y direction perpendicular thereto determines the load introduction direction, which is typically directed perpendicularly from the top to the bottom, or vertically, and is directed towards the ground following gravitation. The third direction, Z, runs perpendicular thereto (and in the circumferential direction in case of a circular arrangement).

The weighing sensor comprises a section of a fixed base element, to which the parallel guidance elements are articulated. The parallel guidance elements run substantially along the X direction and guide a load receiver movable in the measurement direction Y relative to the base element.

In addition, a section of the base element that can be used for supporting levers or for accommodating components of the compensation system is provided according to the invention between the parallel guidance elements. The arrangement of components of the compensation system at this projecting section allows in particular a substantially more compact type of construction in comparison to prior art.

A series of at least two levers functionally connected one after the other that are used for transmitting or translating a load acting on the load receiver is also provided. They direct this load to the force compensation system and pass around the projecting section of the base element in the process. At least one component of the force compensation system, i.e., a magnet, a coil or parts of the position detection system, can be arranged on a lever arm of the last lever of the aforementioned series.

A key feature of the invention is that at least one of the above-mentioned components (magnet, coil or position detection system) is arranged close to the load receiver in the X direction, but at least closer to it than to the base element section. The position of the force compensation system is thereby fixed in such a way that in the X direction it assumes a sufficient, or best possible, distance in the direction towards the load receiver from the section of the base element forming the stationary base.

By passing around the projecting section, construction space is optimally used for long lever lengths. This embodiment also advantageously allows a sensor with increasing width in the direction towards the load receiver, in addition to, for example, a rectangular base shape of the weighing sensor. In this case, the force compensation system, which sometimes takes up space, is substantially encompassed by the outline of the weighing sensor, or is accommodated therein. In any case, a particularly compact type of construction with a sufficiently large transmission ratio is guaranteed, since at least two transmitting or translating levers are provided in order to convey or translate the introduced load. The objective known from prior art of arranging the force compensation system in the vicinity of the stationary base as much as possible, or on the side facing away from the load receiver, is deliberately abandoned. In the interest of as compact a construction as possible, the force compensation system is instead arranged between the stationary base and the load receiver, specifically in such a manner that it assumes as great a distance in the X direction as possible from base element forming the actual stationary base.

It may be noted that one or more levers can also serve for simple transmission (without force translation) of gravitational force, by constructing the lever arms to be of equal length. In particular, it would then be conceivable to provide a lever without translation effect running substantially in the X direction, while a lever running in the opposite direction could have differently long arms to effect a force translation. The translation power does indeed remain below what is possible for it, but the invented arrangement of the force compensation components in the vicinity of the load receiver thereby also becomes possible.

According to another embodiment of the invention, a second or an additional lever, arranged immediately downstream in the direction of force flow, extends from its first to a second end, the first end facing the base element section that also bears the parallel guidance elements (not the projecting section of the base element). The lever extends according to the invention substantially in the X direction towards its second end, which faces the load receiver. According to the invention, this lever is intended to be the last one in the direction of force flow, which runs substantially in the X direction. In particular, there should thus be no additional downstream lever that again runs in the opposite X direction, i.e., in the direction towards the stationary base. (On the other hand, a downstream lever running substantially in the Y direction, e.g., an angle lever as well, is quite possible, since it only determines the X position of the force compensation system to an insignificant degree.

This lever is preferably the second and also the last one in the weighing sensor. A first lever leads here from the load receiver (supported on the projecting section of the base element) in the direction towards the actual base element, while the second lever (parallel thereto, for example) is led back in the direction towards the load receiver. A very high transmission ratio can already be achieved with these two levers, which would not be possible in a design with only one lever. To achieve as high a transmission ratio as possible, the second lever is constructed to be as long as possible, in order for a magnet or a coil to be arranged at its end. Accordingly, this magnet or this coil will be situated as close as possible to the load receiver, since the lever extends away from the above-described base element section in the direction towards the load receiver. This allows the already described short or compact type of construction with a high transmission ratio.

An additional advantageous embodiment of the invention provides that at least one lever from the series of force transmission or coupling levers is an angle lever. Such a lever directs the force to be transferred/coupled from the X direction to the Y direction and vice versa. This allows the concatenation of several levers in a tight space.

The last lever in the direction of force in particular can be an angle lever. This angle lever will advantageously be supported on the projecting section of the base element. Different orientations of the components of the force compensation system carried by the lever are possible by using such an angle lever. Thus the coil or the magnet can lie substantially horizontally (the axis of the coil or magnet runs in the Y direction) or vertical (the axis runs in the X direction). This guarantees additional freedom in the housing of the components in the vicinity of the load receiver.

In order to pursue the inventive concept further and further increase the distance between force compensation components and the stationary base, the last lever in the direction of force flow can even protrude into a recess of the load receiver or project through it. The extension of the lever in the X direction thus is not hampered by the load receiver; instead, additional lever arm length is obtained, which can be used for arranging force compensation components. Accordingly, one or more of these components can protrude into or project through this recess.

The weight force originally introduced into the load receiver (after double stepdown and guidance around the projecting section of the base element) is thus initially led back into the area of the load receiver and compensated there by the force compensation system. The particularly skillful type of construction with a recess in the load receiver further reduces the necessary extent of the entire weighing sensor in the X direction. It is even conceivable to arrange the lever or the components borne by it on the side of the load receiver facing away from the stationary base. The lever can thus project completely through the load receiver (in case of a circular arrangement of the weighing sensors, this will be the radially-outward directed side of the load receiver) in order to use additional lever arm length.

In further development of this concept according to an additional embodiment of the invention, the projecting section of the base element can also be led into or through a recess of the load receiver. In this case, the projecting section of the base element also extends as far as possible in the direction towards the load receiver, in order to form bearing points there for levers to be supported or for a component of the force compensation. This yields a further optimized compromise between maximum lever arm length and as small an overall length as possible, since the load receiver and the projecting section can now lie one inside the other in part.

The weighing sensors according to the principle of electromagnetic force compensation expediently have a position detection system which is intended to detect the deflection of the last lever in the direction of force flow, in order to compensate it in a known manner by a suitable coil current.

According to an additional embodiment of the invention, such a position detection system is arranged in a recess of the load receiver, on the projecting section of the base element or on a magnet or a coil. The arrangement in a recess of the load receiver particularly saves construction space and advantageously leads to a more compact type of construction for the weighing sensor. Moreover, the position detection system is easily accessible from the outside if the recess penetrates completely through the load receiver.

It is further advantageously provided that the last lever in the direction of force flow is constructed for accommodating at least one preferably rotationally symmetrical compensating weight. A given loading condition of the weighing sensor is equalized by such a compensating weight. Advantageously, the longer the associated lever arm on which the weight is located, the lower the weight can be.

A rotationally symmetrical counterweight for a lever arm has the advantage, independently of the above-mentioned special embodiments of the weighing sensor, that it is easily manufactured and (because it is rotationally symmetrical) is unambiguously oriented by the mounting of its axis. The center of gravity always remains on its axis. By modifying the height of the weight element along its axis, the weight as such can be changed without moving the center of gravity out of the axis. Insofar as the weight cooperates with a stop, as will be seen below, this stop can be provided as a likewise rotationally symmetrical recess, inside which the weight rests. It can then be used as a stop in two mutually perpendicular directions, the space between the counterweight and the stop then being a circular ring.

In connection with the above-mentioned special embodiments, but also independently thereof, the arrangement of such a weight at the end of the (preferably last) lever of a weighing sensor is attractive. This lever can also preferably protrude into a recess of the load receiver in order to save construction space. The arrangement of several compensating weights, of which at least one can be arranged in the area of such a recess, is conceivable in principle. If the recess penetrates completely through the load receiver here as well, the compensating weight can easily be put in place or oriented from the outside and can even lie completely on the side of the load receiver facing away from the base element. This concept, which in general is novel for a wide variety of scales, can advantageously be combined with one of the above-mentioned embodiments and then facilitates their desired simple and compact construction.

According to another embodiment of the invention, a fine calibration of the obtained positioning of the common center of gravity of all compensating weights in the Y direction or Z direction is provided. As will be seen for the Y direction with reference to FIG. 5, this can be a simple screw device.

The weighing sensor according to the invention can also be rotated. The rotation preferably takes place about an axis running in the Y direction that forms the center of a circular arrangement of several such weighing sensors. Centripetal forces correspondingly act on the components of the weighing sensor and in particular on one or more compensating weights, if these are provided as described above. In order to avoid the bending torques resulting from the centripetal forces of the compensating weights, it is provided according to the invention that the common center of gravity of all compensating weights in the Y direction be arranged at the height at which the last lever (on which the weights are arranged) is supported relative to the stationary base. In this manner, only centripetal forces in the radial direction impinge at the fulcrum in case of a rotation of the weighing sensors, without generating torques about the fulcrum. An additional novel improvement step for scales in general can be advantageously combined with one of the above-mentioned embodiments, but can fundamentally also be used independently thereof for other weighing sensors. It is provided that the load receiver comprises a stop in the Y or Z direction for the last lever or for at least one compensating weight arranged on the last lever. In the unloaded or overloaded state of the weighing sensor, the last lever in the direction of force flow is deflected too far if such a stop is not provided. Instead of providing this stop on the stationary base as in prior art, it is now formed in a space-saving and functional manner directly on the load receiver, with which the corresponding lever arm then cooperates according to the invention. The lever arm can stop directly at the recess or at a suitable stop inside the recess of the load receiver. Alternatively, a compensating weight arranged on the lever can also strike the load receiver if the loading or unloading of the weighing sensor causes it to do so. In the present case or in connection with the invented weighing sensor, construction space is saved in keeping with the problem; the already present load receiver is also elegantly used for the stop function.

Figure 4:
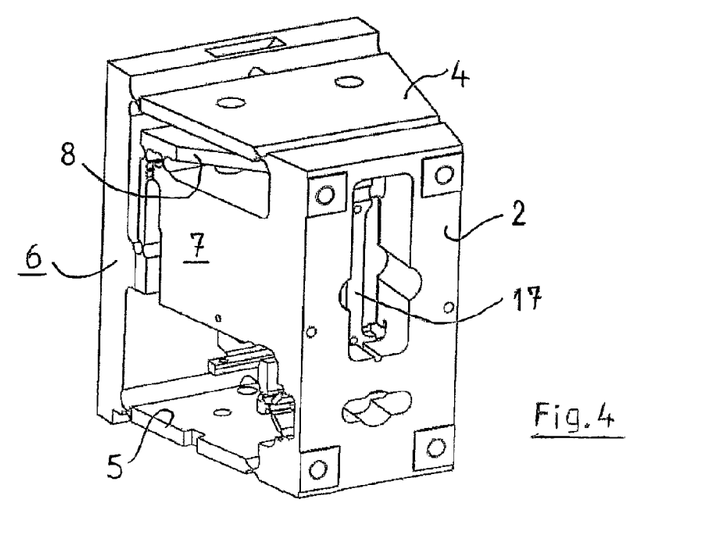
FIG. 4 is a weighing sensor in a view from the rear.
Figure 5:
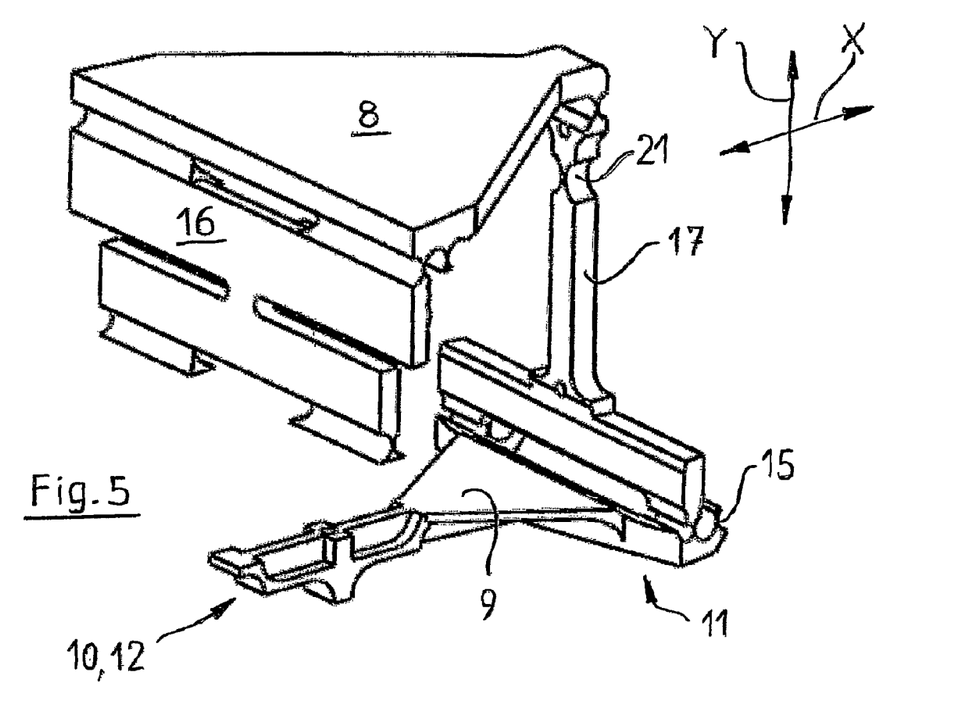
FIG. 5 is a cutaway lever arrangement for a weighing sensor according to the invention.

An especially compact construction results according to an additional advantageous embodiment of the invention by arranging at least one lever or lever part or at least one coupling element or coupling element part in the Y direction in at least one recess in the projecting section of the base element, or running it through the recess there. The corresponding lever or coupling element need not then be subdivided or asymmetrically arranged in order to run on one or both sides of the projecting section of the base element. Instead, the projecting section of the base element can be circumvented in functional effect by running the corresponding lever or coupling element (or even only parts thereof) preferably in the center through the recess of the section, as shown in FIGS. 4 and 5.

The arrangement of only a part of a lever in the recess is also possible. However, even several levers can be accommodated in the recess that can be coupled to one another by coupling elements if required for the transfer of force.

The recess can advantageously be formed as a passage opening surrounded by the base element in the X and Z directions, so that the projecting section (viewed in the Z direction) remains connected to the base element in front of and behind the recess. This allows a particularly simple form of the lever or coupling element as well as a construction of the projecting section of the base element that is as wide and torsion-resistant as possible.

Coupling elements according to this application are understood to be elements that transfer forces from the load receiver into a lever or from a lever onto an adjacent lever, i.e., in order to transfer forces in the direction of force flow up to the force compensation system. Coupling elements are also those elements which support a lever on the fixed base element. In either case, the coupling element can also be reduced to a thin section that is arranged, for example, between two directly adjacent levers.

Even though it is sought in principle to introduce the load to be weighed as centrally as possible into the load receiver when weighing cells are being operated, an edge-loaded or an asymmetric introduction of the weight force to be measured into the load receiver cannot always be avoided. This has the effect that a tilting or bending torque is introduced into the coupling elements or levers and produces measurement inaccuracies. A bending torque can be compensated by such a thin section, as is already described in EP 0 291 258 A2.

As a further development of this idea, it is therefore provided that at least one coupling element upstream or downstream of a lever in the direction of force comprises a thin section to avoid conveyance of bending torques that extends in the direction of the torque to be avoided. According to a novel inventive concept, this can be, in particular, a coupling element arranged downstream of the first lever in the direction of force flow. If the first coupling element in the direction of force flow, which is articulated to the load receiver, is constructed without such a thin section, it is capable of introducing forces in the Y direction into the first lever, which in turn emits them via its support point largely or completely into the base element. Just like the first coupling element in the Z direction, this support point can be constructed relatively broadly and, in particular, can transfer tensile/compressive forces well in this direction, without being damaged itself. A thin section of the type described above that is provided in the subsequent coupling element eliminates the further transmission of any residual torques in the X direction.

The above-described feature can be used in principle for all weighing sensors with at least two coupling elements, independently of the weighing sensors of the present application. A particularly secure force transmission free of interfering forces results in conjunction with the above-described measuring sensors of the present application.

The previously described embodiments were distinguished in that the force compensation system was arranged between the parallel guidance elements. According to an additional advantageous embodiment of the invention, the force compensation system can also be arranged above or below the two parallel guidance elements, however. In this case, a lever or coupling element extends for force transmission in the direction towards the force compensation system to a recess in one of the parallel guidance elements, or in the section of the base element bearing the two parallel guidance elements. At least the components of the force compensation system can thereby be removed from the compact interior of the weighing sensor and arranged, in particular, above or below the parallel guidance elements. This saves construction space between the parallel guidance elements in the Y direction. A force compensation system arranged in this manner is easily accessible, depending on the embodiment. Outside the intermediate space defined between the parallel guidance elements, the force compensation system can also be arranged in different directions. Thus, the axis of the coil or of the magnet can run here in the Y or X direction as well. The last lever in the direction of force flow in particular can also again be a lever running substantially in the X direction, which bears the coil or the magnet at its free end. It is then supported, for instance, on an upward or downward extension of the base element section supporting the parallel guidance elements.

For force transmission into the area outside the parallel guidance elements, a lever or a coupling element can pass through one of the parallel guidance elements. Alternatively the lever or the coupling element can also be run upwards or downwards through a recess inside the base element supporting the parallel guidance elements.

According to another advantageous embodiment of the invention, a recess in the load receiver or base element (and possibly in a parallel guidance element) is provided in order to accommodate at least one acceleration sensor. The latter is intended to detect the acceleration forces in one or more directions and can be accommodated in a space-saving manner by the inventive arrangement. Here as well, the volume of the load receiver is used in part for accommodating an additional component, in order to save construction space. This novel concept is also applicable independently of the subject matter of the present application for weighing sensors with load receivers, base elements and parallel rod structures, and advantageously saves additional construction space which, without the recess, would have to be provided separately.

Additional advantageous embodiments follow from the subordinate claims, and the drawings and detailed description below.

BRIEF DESCRIPTION OF THE DRAWINGS

The invention will be described in detail below with reference to figure examples.

DESCRIPTION OF ILLUSTRATIVE EMBODIMENTS

Figure 1:
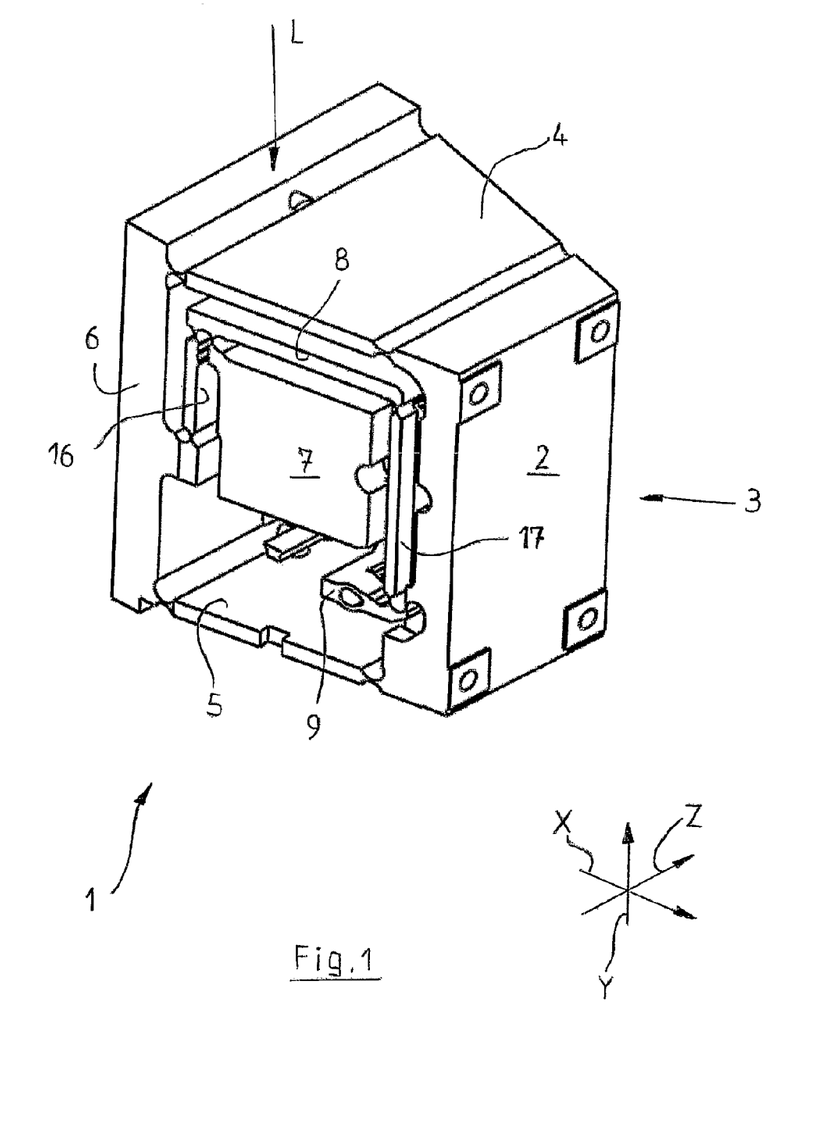
FIG. 1 is a schematic and perspective side view of a weighing sensor according to the invention.

A weighing sensor according to the invention is shown in a perspectival view in FIG. 1. The weighing sensor extends in the three mutually perpendicular spatial directions, X, Y and Z. A stationary base element 3 closes off the weighing sensor at one side in the X direction, while a load receiver 6 that substantially forms the boundary of weighing sensor 1 is arranged on the opposite X-direction side.

Two parallel guidance elements 4 and 5 connect a base element section 2 to load receiver 6, so that the latter is movably articulated to base element 3 in a load introduction direction Y. Additionally, base element 3 extends from base element section 2 in the form of a projecting section 7 into the area between the two parallel guidance elements 4, 5. This projecting section 7 of base element 3 serves as an abutment or support point for levers or components of the force compensation system, as will be seen.

Load receiver 6, movable in the Y direction, impinges via a coupling element 16 on a first lever 8 that is supported on projecting section 7 of base element 3. On the end of lever 8 facing base element 3, the former is connected via an additional coupling element to an additional lever 9 that is supported on section 2 of the base element. Lever 9 extends from section 2 in the X direction towards load receiver 6. Receptacles for components of the force compensation system (magnet M, coil S or position detection system P in FIG. 2) are provided in load receiver 6. By a suitable selection of the lever arm lengths of levers 8 and 9, a sufficiently high transmission ratio of the load L introduced into load receiver 6 results that it can be compensated by means of a corresponding compensation current in coil S.

It is additionally recognizable in FIG. 1 that levers 8 and 9, or coupling elements 16 and 17, pass around projecting section 7 of base element 3 in functional effect, and thus allow a high transmission of force with the best possible utilization of the construction space.

Figure 2:
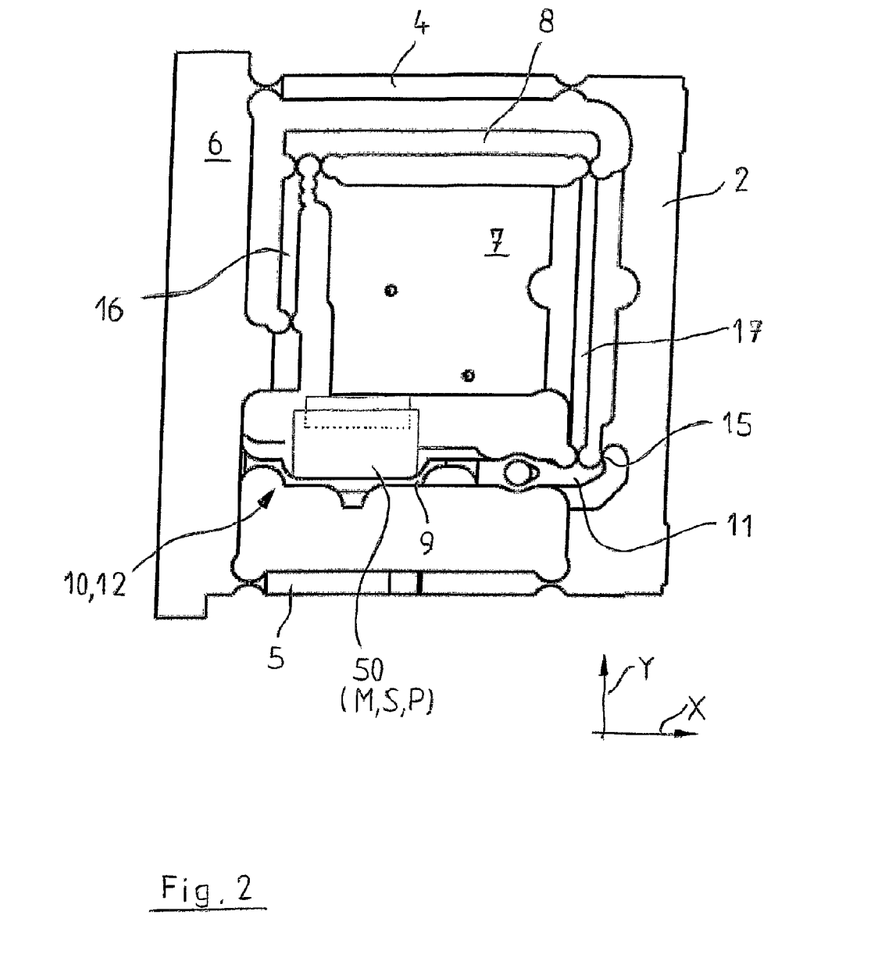
FIG. 2 is such a weighing sensor in a perspective side view.

The weighing sensor according to the invention is shown in a pure side view in FIG. 2. In the right-hand part of FIG. 2, section 2 of the base element and section 7 of the base element that projects between parallel guidance elements 4 and 5 are again recognizable. Upper lever 8 is again connected via coupling elements 17 to lower lever 9. In the view according to FIG. 2, coupling element 17 runs "in front of" the connection of section 2 and section 7 of the base element. Coupling element 17 can also be subdivided and run in the direction towards lever 9 on both sides of the connection area between section 2 and section 7. According to FIG. 4, it is also possible to run coupling element 17 in approximately the center.

Coupling element 17 impinges on the last lever in the direction of force flow 9, first end 11 of which is supported via a support point 15 on section 2 of the base element, while the second end 12 extends as a free lever 10 in the direction towards load receiver 6, and projects into a recess of this load receiver 6.

Force compensation system 50, which can comprise one or more magnets M or coils S, is schematically shown on lever arm 10. A position detection system P can also be arranged on lever arm 10. Projecting section 7 of the base element serves to accommodate an associated component of the force compensation system, so that, for instance, a magnet M is carried by lever arm 10 and a coil S is carried by section 7 (or vice versa).

It is again recognizable how coupling elements 16 and 17 or levers 8 and 9 pass around the projecting section 7 of the base element in functional effect, and that the components M, S and P of force compensation system 50 are arranged relatively close in the X direction to load receiver 6 and as far as possible from section 2 of the base element.

Figure 3:
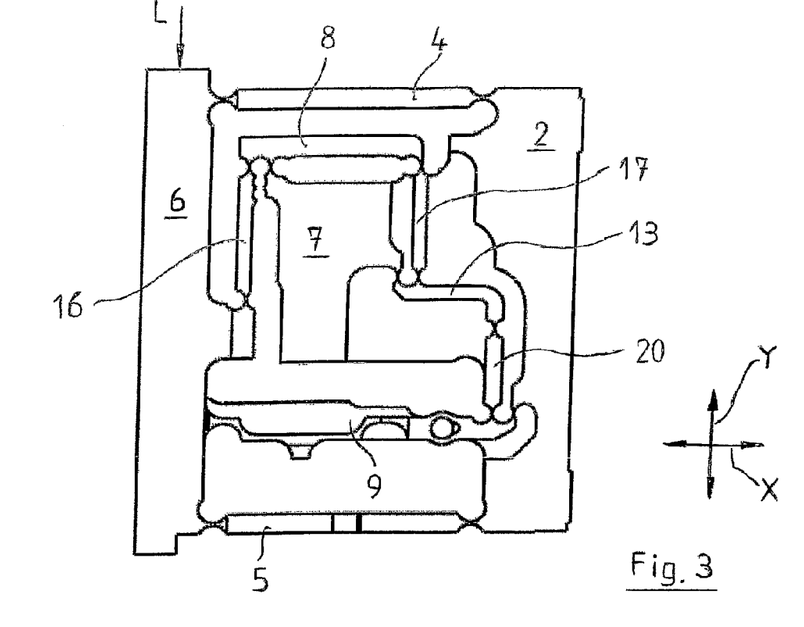
FIG. 3 is a further developed weighing sensor with three transmission levers.

FIG. 3 shows an additional embodiment of the invention, in which levers 8, 13 and 9 are used for force transmission. A load L introduced into load receiver 6 is again transmitted via first coupling element 16 into lever 8. The latter impinges via coupling element 17 on second lever 13. Lever 8 and lever 13 are each supported via abutments on projecting section 7 of the base element. Lever 13 impinges in turn via coupling element 20 on lever 9, which is supported in a known manner on section 2 of the base element. The larger number (3) of levers here allows an increase of the transmission factor. It is again recognizable that the last lever in the direction of force flow 9 extends from section 2 of the stationary base element in the X direction towards load receiver 6 in order to again accommodate one or more components of force compensation system 50 at its free end.

The special guidance of second coupling element 17 is illustrated in FIG. 4. Projecting section 7 extends from stationary section 2 of the base element substantially in its full width or following the form of a trapezoid into the area between parallel guidance elements 4 and 5. Coupling element 17 is run from above section 7 through a recess at the root area of projecting section 7, in order to impinge in the manner described above on the next lever. Projecting section 7 can be constructed particularly stably in this case, while a single coupling element 17 is sufficient to transmit the force further and simultaneously to run around the projecting section in functional effect.

The embodiment of the coupling elements and levers is shown in a cutaway perspectival view in FIG. 5. Coupling elements 16, which impinges at its lower exposed end on load receiver 6, not shown, is recognizable. It impinges on lever 8, which is in turn connected to coupling element 17. Lever 8 runs here in tapered form in the X direction towards section 2, not shown. There it impinges via a thin section 21 on coupling element 17. Thin section 21 prevents the further transmission of bending torques oriented in the X direction. Coupling element 17 passes downwards in the Y direction through a recess illustrated in FIG. 4, where it is again widened and impinges at first end 11 of last lever 9. Lever 9 is again supported via a support point 15 on section 2 of the base element, not shown.

Figure 6:
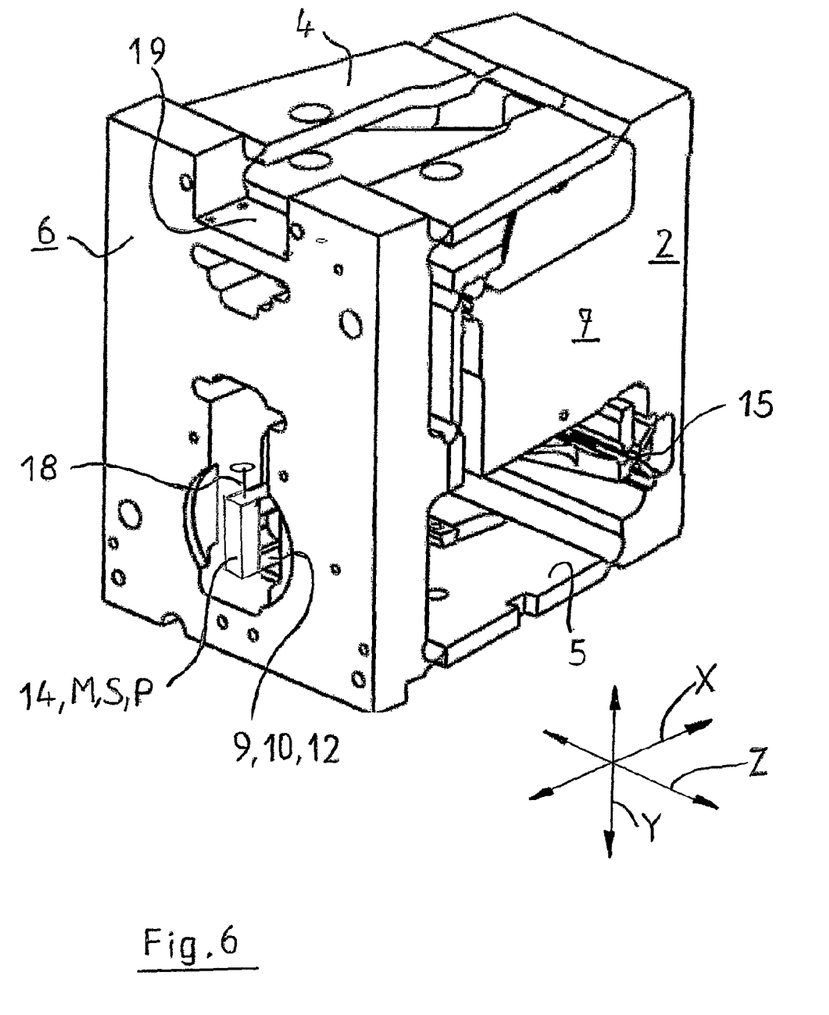
FIG. 6 is a weighing sensor in a front view with recesses in the load receiver.

The weighing sensor with additional characteristics according to the invention is shown in FIG. 6. In the upper section of load receiver 6, a recess 19 that also passes in the X direction through upper parallel guidance element 4 is recognizable. This recess 19 serves to accommodate at least one acceleration sensor, which can thereby be accommodated in a space-saving manner.

Load receiver 6 further shows an additional recess lying beneath it into which lever 9, coming from section 2, projects with its second end 12. By virtue of this recess it is possible to optimally lengthen the lever arm of the last lever in the direction of force flow, in order thereby to increase the transmission ratio performance. Instead of arranging the components of force compensation system 50 (magnet M, coil S, position detection system P) in the area between load receiver 6 and section 2, these components can be moved forward into the area of the illustrated recess of load receiver 6, in order thereby to utilize construction space optimally. Position detection system P in particular can be easily housed and calibrated here.

Additionally or alternatively, at least one compensating weight 14, which is placed on lever 9, can be arranged in this or in another recess in load receiver 6. In this position, compensating weight 14 is easily mounted. In addition, load receiver 6 can advantageously comprise a stop for compensating weight 14, in order to relieve the weighing sensor in case of overload or in the rest position. A fine calibration device 18, with which the center of gravity of the compensating weight (several such weights are also conceivable) can be adjusted overall, more particularly in relation to support point 15 of lever 9, can also be provided in the area of the recess of the load receiver.

An approximately round recess in load receiver 6 allows the use of likewise roughly circular compensating weights, in which case the recess can then serve as a stop effective in the Y and the Z directions.

As used herein, the terms "comprising," "including," "carrying," "having," "containing," "involving," and the like are to be understood to be open-ended, that is, to mean including but not limited to.

Figure 7:
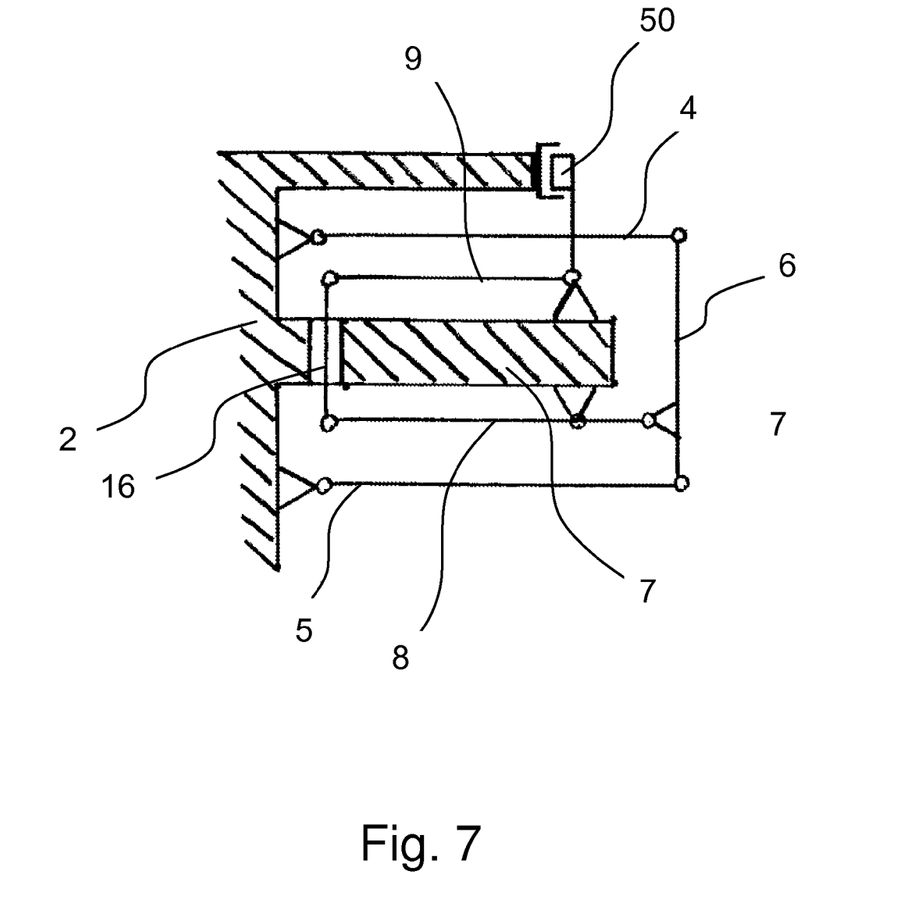
FIG. 7 is a schematic representation of a weighing sensor having an alternate arrangement of levers according to the present invention.

The embodiment shown schematically in FIG. 7 includes an arrangement in which coupling element 16 between lever 8 and lever 9 extends through a recess in projecting section 7 of the base of the weighing sensor. Also, lever 9 in this arrangement is angled so that a portion thereof extends upwardly through a recess in the upper guidance element 4. This arrangement places force compensation system 50 above upper guidance element 4.

Figure 8:
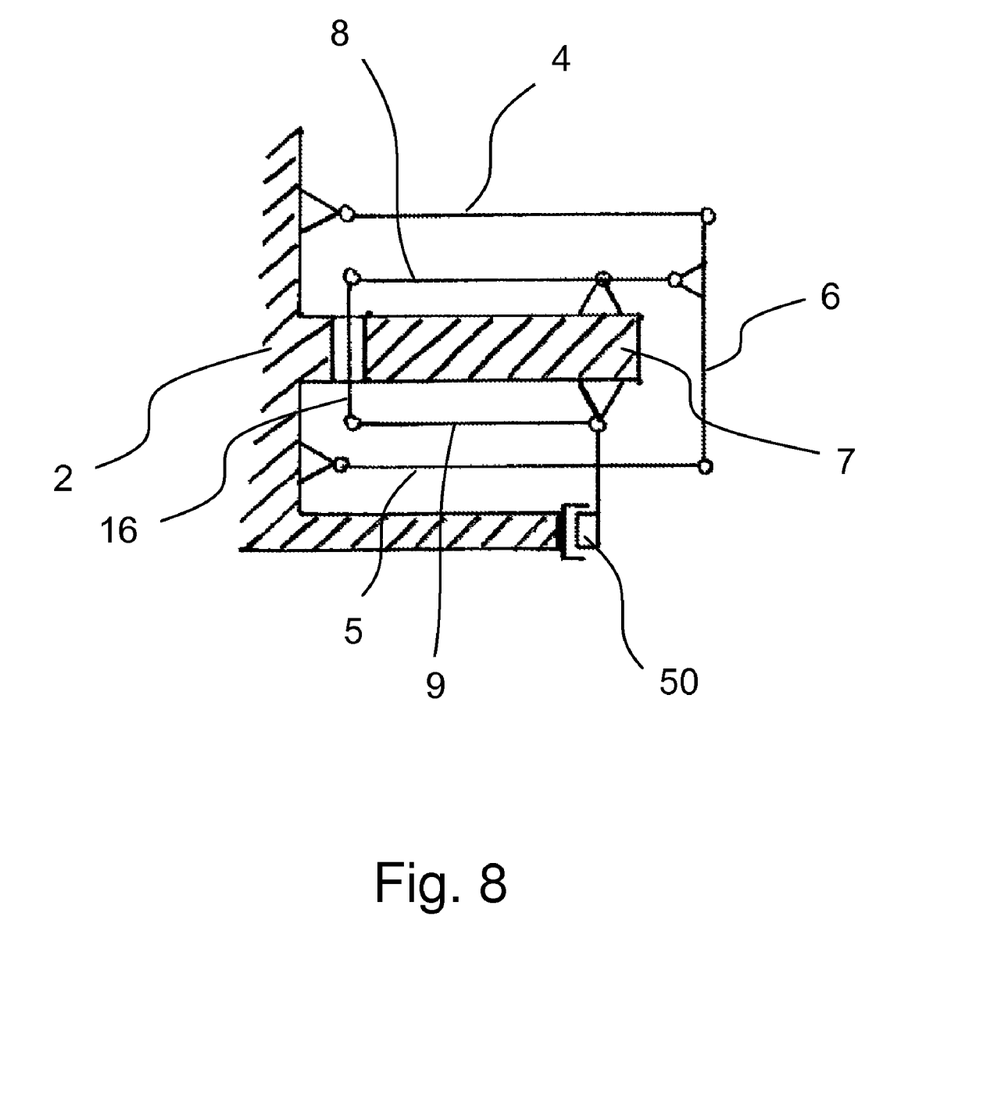
FIG. 8 is a schematic representation of a weighing sensor having another alternate arrangement of levers according to the present invention.

The embodiment shown in FIG. 8 includes another arrangement in which coupling element 16 between lever 8 and lever 9 extends through a recess in projecting section 7. However, lever 9 in the embodiment of FIG. 8 is located below projecting section 7 with a portion extending through a recess in lower guidance element 5.

Figure 9:
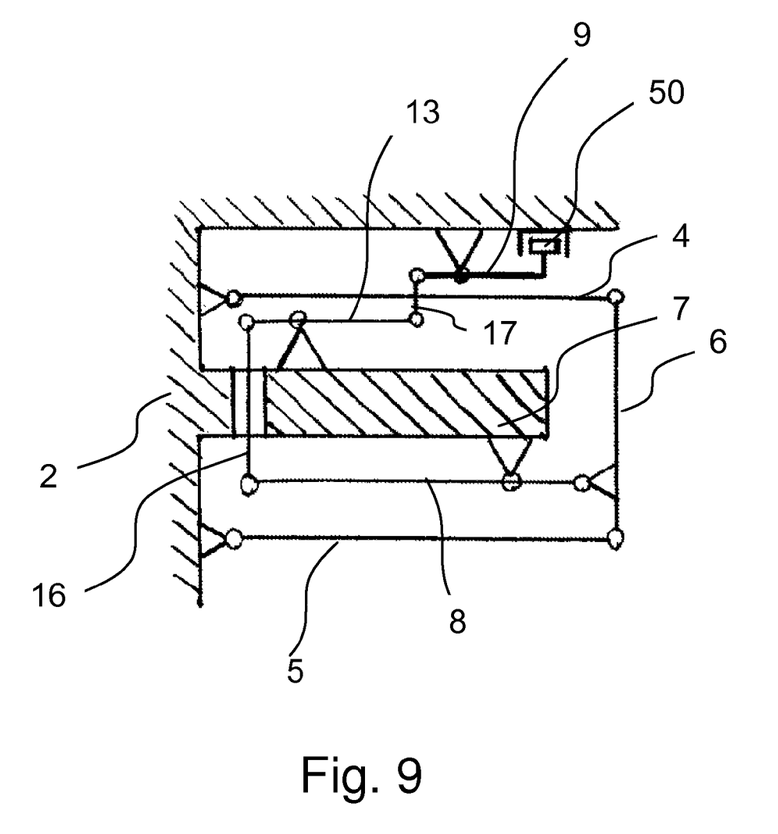
FIG. 9 is a schematic representation of a weighing sensor having another alternate arrangement of levers according to the present invention.

FIG. 9 shows an embodiment in which lever 13 is interposed between lever 8 and lever 9. Coupling element 16 extends through a recess in projecting section 7 of the weighing sensor base while coupling element 17 extends through a recess in upper guidance element 4. This arrangement places force compensation system 50 above upper guidance element 4.

Figure 10:
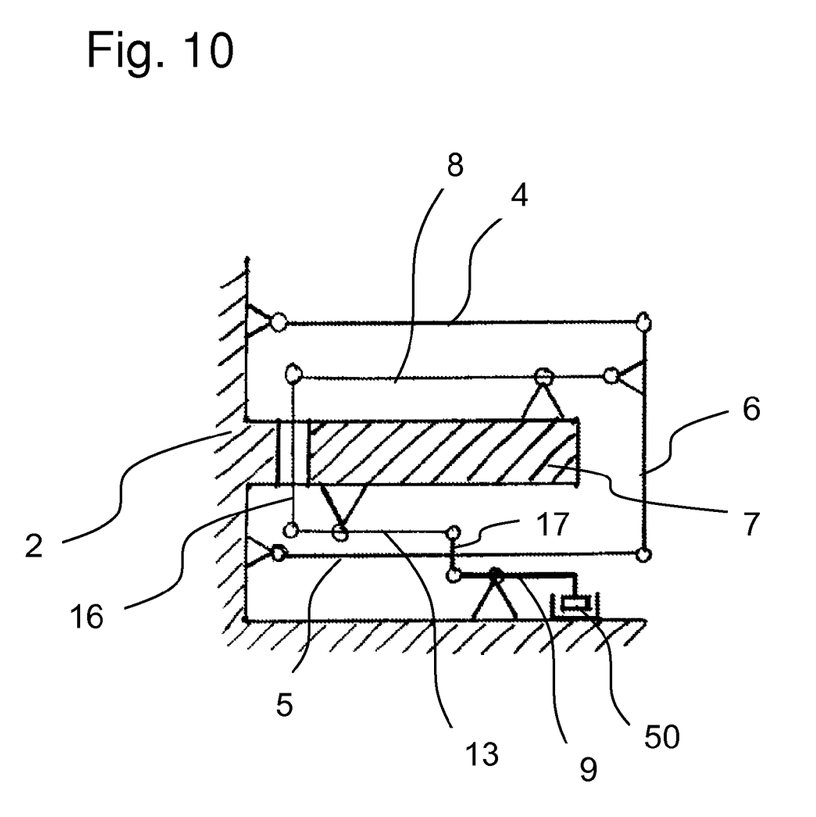
FIG. 10 is a schematic representation of a weighing sensor having another alternate arrangement of levers according to the present invention.

The embodiment of FIG. 10 is similar to that shown in FIG. 9 in that it includes second lever 13 interposed between lever 8 and lever 9. In the arrangement of FIG. 10, however, coupling 17 extends through a recess in lower guidance element 5 such that force compensation system 50 is located below lower guidance element 5.

The invention claimed is:

1. A weighing sensor for an electronic scale on the principle of electromagnetic force compensation, with elements that extend in a first direction (X), a direction (Y) perpendicular thereto, and a direction (Z) perpendicular to directions (X) and (Y), with at least one electromagnetic force compensation system that comprises a coil (S) or a magnet (M) or a position detection system (P), the weighing sensor further comprising:

a) a base element section to which parallel guidance elements are articulated that extend substantially along direction (X) and guide, relative to the base element, a load receiver movable in the measurement direction (Y);

b) a series of at least two levers including a first lever and a last lever, each successive lever in the series being connected by a respective coupling element to the previous lever in the series such that a load acting on the load receiver causes force to be transmitted from each lever in the series to the next successive lever in the series, and the last lever transmits a resultant force to the electromagnetic force compensation system;

c) wherein a component (M, S or P) of the at least one force compensation system is arranged on a lever arm of the last lever;

d) wherein at least one component (M, S or P) is arranged closer to the load receiver in the X direction than to the base element section; and e) wherein the series of levers and at least one coupling element runs between parallel guidance elements around a projecting section of the base element in functional effect.

2. The weighing sensor of claim 1, wherein the last lever, which is arranged in the direction of force flow, extends from a first end facing the base element section substantially in the X direction to a second end facing the load receiver, wherein the last lever is the last in the direction of force flow that runs substantially in the X direction.

3. The weighing sensor of claim 1, wherein at least one angle lever is provided in the direction of force flow.

4. The weighing sensor of claim 1, wherein the last lever in the direction of force flow is an angle lever, which is supported on a projecting section of the base element.

5. The weighing sensor of claim 1, wherein the last lever projects into or through a recess of the load receiver.

6. The weighing sensor of claim 1, wherein at least one component (M, S, or P) of the electromagnetic force compensation system projects into or through a recess of the load receiver.

7. The weighing sensor of claim 1, wherein the projecting section of the base element is run into or through a recess of the load receiver.

8. The weighing sensor of claim 1, wherein the electromagnetic force compensation system includes a position detection system (P) for detecting a deflection of the last lever, the position detection system (P) being arranged in a recess of the load receiver, on the projecting section of the base element or on the magnet (M) or the coil (S).

9. The weighing sensor of claim 1, wherein the last lever is constructed to accommodate one or more compensating weights, and wherein at least one of the one or more compensating weights projects into a recess of the load receiver.

10. The weighing sensor of claim 9 wherein at least one of the one or more compensating weights is rotationally symmetrical.

11. The weighing sensor of claim 9, wherein the center of gravity of all the compensating weights in the Y direction is arranged at the same height as a support point via which the last lever is supported on the base element.

12. The weighing sensor of claim 9, further comprising a fine calibration device for targeted positioning of a common center of gravity of all compensating weights in the Y direction.

13. The weighing sensor of claim 1, wherein the load receiver comprises a stop in the Y or Z directions for the last lever or for at least one compensating weight arranged on the last lever.

14. The weighing sensor of claim 12, wherein at least one of the levers, or a part of one of the levers, or at least one coupling element or a part of the coupling element in the Y direction is arranged in at least one recess in the projecting section of the base element, or is run through the recess of the base element.

15. The weighing sensor of claim 1, in which, in order to avoid further transmission of bending torques, the at least one coupling element, which is upstream or downstream of at least one of the levers in the direction of force flow, comprises a thin section that extends in the direction of the torque to be avoided.

16. The weighing sensor of claim 1, wherein the force compensation system is arranged at least in part between the parallel guidance elements.

17. The weighing sensor of claim 16, wherein the force compensation system is arranged above or below the two parallel guidance elements, wherein, for force transmission in the direction towards force compensation system, one of the levers or a coupling element connecting two levers extends through a recess in one of the parallel guidance elements or in the base element section.

18. The weighing sensor of claim 1, wherein an acceleration sensor is arranged in a recess of the load receiver or one of the parallel guidance elements.

19. The weighing sensor of claim 1, wherein, for the circular arrangement of several such weighing sensors, the weighing sensor has the form of a trapezoid as viewed from above.

20. The weighing sensor of claim 1, wherein the weighing sensor is monolithic.

21. The weighing sensor of claim 1 wherein the series of levers and at least one coupling element runs around the projecting section of the base element such that at least one of the levers in the series of levers is positioned above the projecting section of the base element in the Y direction and at least one of the levers in the series of levers is positioned below the projecting section of the base element in the Y direction.

* * * * *

UNITED STATES PATENT AND TRADEMARK OFFICE
CERTIFICATE OF CORRECTION

| | | |
|---|---|---|
| PATENT NO. | : 8,232,484 B2 | Page 1 of 1 |
| APPLICATION NO. | : 12/161543 | |
| DATED | : July 31, 2012 | |
| INVENTOR(S) | : Timo Hauck | |

It is certified that error appears in the above-identified patent and that said Letters Patent is hereby corrected as shown below:

Title page; In the Abstract, at page 1, item 57, cancel the Abstract and insert the following Abstract:
--A weighing sensor for an electronic scale on the principle of electromagnetic force compensation, wherein the flow of force via at least two lever arms runs around a projecting section of the stationary base, and the components of the force compensation system are arranged in the vicinity of the load receiver.--

At column 12, line 51, insert the following paragraph immediately after line 51:
--The above described preferred embodiments are intended to illustrate the principles of the invention, but not to limit the scope of the invention. Various other embodiments and modifications to these preferred embodiments may be made by those skilled in the art without departing from the scope of the present invention.--

Signed and Sealed this
Eleventh Day of September, 2012

David J. Kappos
*Director of the United States Patent and Trademark Office*